United States Patent
Allen et al.

(12) 
(10) Patent No.: US 12,472,466 B2
(45) Date of Patent: Nov. 18, 2025

(54) MARINE BASED BUOYANT CARBON SEQUESTRATION STRUCTURE

(71) Applicants: John T. Allen, Hornchurch (GB); Calum D. Fitzgerald, Hornchurch (GB)

(72) Inventors: John T. Allen, Hornchurch (GB); Calum D. Fitzgerald, Hornchurch (GB)

(*) Notice: Subject to any disclaimer, the term of this patent is extended or adjusted under 35 U.S.C. 154(b) by 306 days.

(21) Appl. No.: 18/253,574

(22) PCT Filed: Nov. 18, 2021

(86) PCT No.: PCT/GB2021/052986
§ 371 (c)(1),
(2) Date: May 18, 2023

(87) PCT Pub. No.: WO2022/106823
PCT Pub. Date: May 27, 2022

(65) Prior Publication Data
US 2024/0001295 A1    Jan. 4, 2024

(30) Foreign Application Priority Data
Nov. 18, 2020  (GB) .................................. 2018151

(51) Int. Cl.
*B01D 53/62* (2006.01)
*B63B 35/44* (2006.01)

(52) U.S. Cl.
CPC .............. *B01D 53/62* (2013.01); *B63B 35/44* (2013.01); *B01D 2257/504* (2013.01)

(58) Field of Classification Search
CPC .... B01D 53/62; B01D 2257/504; B63B 35/44
USPC ........................................................ 423/220
See application file for complete search history.

(56) References Cited

U.S. PATENT DOCUMENTS

| | | |
|---|---|---|
| 4,699,086 A | 10/1987 | Mori |
| 5,820,300 A | 10/1998 | Sonoda et al. |
| 2001/0028120 A1 | 10/2001 | Hinada et al. |
| 2010/0213271 A1 | 8/2010 | Bailey et al. |
| 2013/0152864 A1 | 6/2013 | Grajcar et al. |
| 2013/0339216 A1 | 12/2013 | Lambert |

(Continued)

FOREIGN PATENT DOCUMENTS

| | | |
|---|---|---|
| CN | 104273068 A | 1/2015 |
| CN | 111937795 A | 11/2020 |
| GB | 2 462 865 A | 2/2010 |

(Continued)

OTHER PUBLICATIONS

International Search Report and Written Opinion issued in the corresponding International Patent Application No. PCT/GB2021/052986, dated Feb. 23, 2022.

(Continued)

*Primary Examiner* — Anita Nassiri-Motlagh
(74) *Attorney, Agent, or Firm* — Foley & Lardner LLP

(57) ABSTRACT

The present invention concerns a marine-based carbon sequestration buoyant structure. The structure comprises a frame, a peripheral platform area (1) for housing accommodation and amenities, and carbon sequestration apparatus, wherein the frame supports the peripheral platform area and carbon sequestration apparatus (2,3).

The present invention further relates to a method of carbon sequestration, the method comprising providing the marine-based carbon sequestration buoyant structure in a major ocean gyre circulation

21 Claims, 1 Drawing Sheet

(56) References Cited

U.S. PATENT DOCUMENTS

2017/0306579 A1    10/2017    Salis

FOREIGN PATENT DOCUMENTS

| GB | 2 472 874 A | 2/2011 |
| GB | 2 477 181 A | 7/2011 |
| JP | H04-156939 A | 5/1992 |
| JP | H07-252819 A | 10/1995 |
| JP | 6432777 B2 | 12/2018 |

OTHER PUBLICATIONS

UK Intellectual Property Office Search Report on app. GB2018151.7 dated Dec. 3, 2021 (2 pages).
Examiner's Report dated May 16, 2024 on App. GB2018151.7 (2 pages).
John Vidal, 2011, "Artificial island could be solution for rising Pacific sea levels", The Guardian, [online], Available from https://www.theguardian.com/environment/blog/201 1/sep/08/artificial-island-pacificsea-levels.
Tafline Laylin, 2011, "Dutch Company Floats New Idea for Artificial "World" Island Investors", Green Prophet, [online], Available from https://www.greenprophet.com/2011/11/floating-islands-dubai/.
GB Search Report for Application No. 2417213.2 mailing date Dec. 13, 2024, 2 pages.

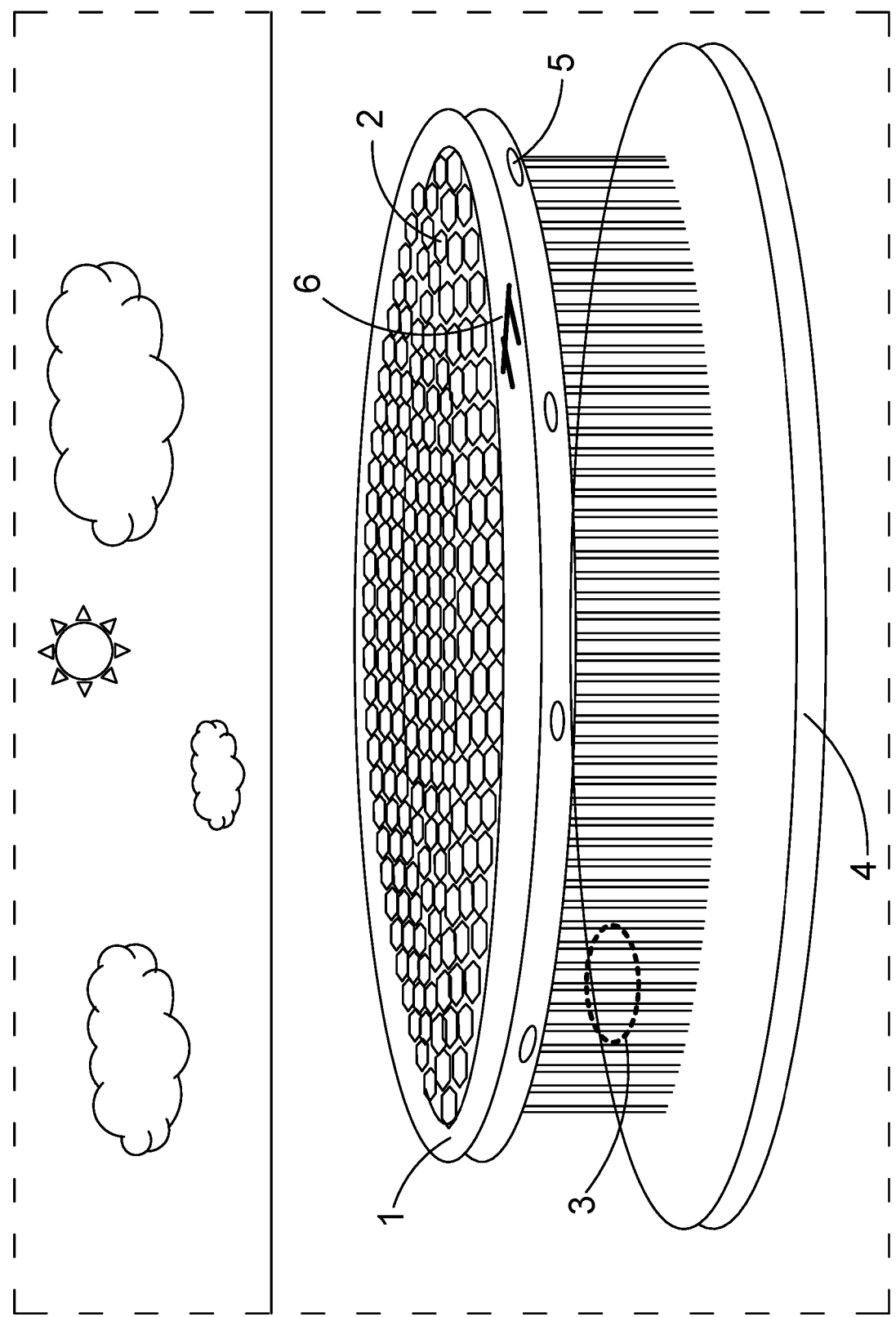

MARINE BASED BUOYANT CARBON SEQUESTRATION STRUCTURE

CROSS-REFERENCE TO RELATED APPLICATIONS

This application claims the benefit of priority to International Application No. PCT/GB2021/052986, filed on Nov. 18, 2021, which claims the benefit of United Kingdom Application No. 2018151.7, filed Nov. 18, 2020, all of which are hereby incorporated by reference in their entirety.

FIELD OF THE INVENTION

The present invention relates to a carbon sequestration buoyant structure and in particular, the invention relates to a structure suitable for carbon sequestration, and for housing accommodation and amenities within a marine based environment.

BACKGROUND

It is widely accepted that increasing levels of carbon dioxide, as well as other greenhouse gases, are a primary driver of climate change. As such, there exists a need to increase carbon sequestration in order to capture more carbon dioxide from the atmosphere and the ocean, and convert it into secure sources which lock the carbon away for hundreds or thousands of years. In this connection, photosynthetic organisms in the ocean such as phytoplankton are capable of capturing carbon via photosynthetic fixation and carbon can be stored short-term in living biomass and longer-term in deep ocean circulation, sinking detrital matter, marine sediments and eventually the sea-bed.

Global biomass cycles approximately 200 gigatonnes (Gt) of carbon annually with the atmosphere, where $1\ Gt=10^9$ (10,000,000,000) tonnes, Human carbon dioxide emissions contribute to the growing problem, adding a further imbalance of around 7-9 Gt annually, mainly through the burning of fossil fuels, and cement production. The Global biomass carbon cycle is reasonably evenly split between the land and the ocean, with the land having the small majority share.

In this respect, the oceans contain only around 3.0% of the global plant biomass at any one time, but their turnover is rapid. It therefore follows that a small increase in ocean biomass, for example to 3.3% or perhaps 3.5% of the global total, would effect the countering of anthropogenic emissions from fossil fuels and cement.

However, the oceans are light limited and so typically only the top 30-70 metres of the ocean is illuminated sufficiently for photosynthesis to occur. On average, the oceans are around 4000 metres deep which means only around 1% of the ocean is available for primary production.

Furthermore, over a significant proportion of the ocean surface, photosynthesis is co-limited by nutrient concentrations. However, the nutrient concentrations in deep waters remain high, and are therefore a potential resource for photosynthesis.

In GB2462865, there is disclosed a marine-based carbon sequestration device which includes light collecting components, light conduit components and light emitting components designed to create light zones, located away from the natural photo zone of a marine environment.

Whilst providing important information relating to apparatus for carbon sequestration in a marine context, GB2462865 has its limitations with respect to implementation of such apparatus.

The present invention as such aims to provide a commercially viable solution to the problem of oceanic carbon sequestration, in order to negate carbon dioxide emissions from both the fossil fuel and cement industries.

The present invention aims to provide a structure that will facilitate increased ocean productivity, increased uptake of atmospheric carbon dioxide compared to current anthropogenic excess production, and reduction of ocean acidification, alongside the provision of a vast new living space and leisure industry.

SUMMARY OF THE INVENTION

According to a first aspect of the present invention, there is provided a marine-based carbon sequestration buoyant structure, comprising:
 a frame;
 a peripheral platform area for housing accommodation and amenities;
 and carbon sequestration apparatus;
 wherein the frame supports the peripheral platform area and the carbon sequestration apparatus.

In this connection, the peripheral platform area is configured to at least partially encompass the carbon sequestration apparatus.

In this regard, the marine-based carbon sequestration buoyant structure comprises carbon sequestration apparatus configured for use in the major ocean gyre circulations. More particularly, the structure is configured for use in the five major ocean oligotrophic gyres.

In this regard, the structure comprises propulsion/tethering/anchoring/floatation mechanisms suitable for stabilising the structure in oligotrophic gyres. These may include particular buoyancy means for the light capturing devices, and manoeuvring means to maintain the structure in a geo-stationary, or substantially geostationary capacity.

In this connection, oligotrophic gyres are situated between approximately 10-40 degrees latitude north and south of the equator. In total these gyres make up approximately ⅐th, approximately 50 million square kilometres, of the ocean surface. The oligotrophic gyres are the anticyclonic circulation regions of the tropical and subtropical major ocean basins, which rotate clockwise in the northern hemisphere and anticlockwise in the southern hemisphere. Nutrient concentrations of the near surface layers run out quickly in these regions after the first few days of a photosynthetic growth period and remain largely depleted until and unless storms and cooling overturn the water column and mix deeper waters into the surface layers.

Due to the convergent physical nature of the circulation of the oligotrophic gyres, there is little significant seasonal upward mixing of nutrient rich waters into the surface layers, which have comparatively weak seasonal cycles. Only occasional intense storms ventilate the deep pool of nutrients into what is otherwise a vast oceanic desert where the existing nutrients are "locked up" by resident biomass, providing little carbon uptake per unit area. This ventilation process seldom occurs in the 5 tropical and sub-tropical oligotrophic gyres of the world's global ocean basins.

In this regard, the present invention aims to address the problems associated with oceanic carbon sequestration, particularly in relation to oligotrophic gyres.

Oligotrophic gyres are attractive sites in that they are some of the world's most stable environments with comparably stable and easily forecastable weather systems. Their deep water location puts them at very low risk from Tsunamis caused by tectonic action, and their remote location makes them an apolitical solution for sustained global management without national bias.

The scale of the buoyant structure allows for suitable monitoring of the quantity of carbon sequestration at Real Time or Near Real Time The scale of the buoyant structure allows for a peripheral platform area for housing both accommodation and amenities. The peripheral platform area can in this respect host a wide variety of accommodation and amenities, including for example: hotels, bars, restaurants, and other tourist attractions, as well as an international airport.

The frame supports the peripheral platform area and also affords structure from which the carbon sequestration apparatus can be mounted. The carbon sequestration apparatus can be contained but free-floating. Alternatively, the apparatus may be geometrically locked, or held in a semi- or fully-rigid geodesic spaceframe. The apparatus is modular to allow for easy repair and replacement of individual components.

In this regard, the peripheral platform area preferably takes on an annular shape. As such, the marine-based structure may conveniently comprise a moon pool within the peripheral platform area. The carbon sequestration apparatus may as such be mounted in the moon pool.

The moon pool may have a diameter of substantially 46 kilometres.

In a further alternative embodiment, the peripheral platform area is provided as a cross-shaped or grid-like configuration. In such a configuration, the carbon sequestration apparatus is preferably provided between elements of the peripheral platform area extending normally, or at some other regular geometry, to one another.

Preferably, the carbon sequestration apparatus comprises a light transmitting means. Optionally, the apparatus comprises a light providing means, Optionally, the apparatus comprises a light transmitting means and a light providing means.

Conveniently, the light transmitting means may comprise a plurality of light pipes or light trees. The light pipes or light trees may be in the form of glass tendrils, comprising fibre-optic elements. The glass tendrils may conveniently extend approximately 70 to 300 metres below the water surface level. This enables light transmission into the depths below the surface water, where nutrients are present, in order to facilitate photosynthesis. Preferably, the light pipes or trees may further comprise a surface lens.

Preferably, the glass tendrils may also extend around 10 kilometres radially outward. In this way, light transmission into the water below and surrounding the buoyant marine-based structure is maximised.

Typically, each buoyant platform could preferably support around 1.5 billion light pipes or light trees.

Whilst glass tendrils are one option, other suitable deep ocean light transmitting means may also be used.

Preferably, the light providing means may comprise a plurality of photo-voltaic panels, electrical conductors, and artificial light emitting devices. The photo-voltaic panels can produce electrical current at the water surface.

Preferably, the electrical conductors can be copper conducting cables.

The light emitting devices can preferably be light emitting diodes. More particularly, the light emitting diodes can have general or specific wavelengths to create artificial light at depth. The electrical conductors may conveniently extend approximately 70 to 300 metres below the water surface level. This enables light provision into the depths below the surface water, where nutrients are present, in order to facilitate photosynthesis.

Light capture and transmission may be optimised for wavelength. This can be achieved through the use of filters, and/or specific wavelength light emitters. The apparatus may further comprise lenses. Lenses can be used to focus the surface light to maximise light transmission and energy capture.

Conveniently, the carbon sequestration apparatus may further comprise a water exchanging means.

The water exchanging means may preferably comprise wave pump tubes. In this regard, the wave pump tubes preferably facilitate exchange of water between the surface and deeper levels by enhancing pumping and mixing across a thermal gradient.

Other suitable water exchanging means may also be used.

The primary productivity (photosynthesis) which is necessary for carbon sequestration is preferably facilitated by a) illuminating deep nutrient rich waters via the light transmitting or light providing means; and b) bringing nutrient rich waters to the surface and breaking down the strong thermocline to increase mixing across the temperature gradient separating the nutrient deplete surface waters and the deeper ocean via the water exchanging means.

Conveniently, the carbon sequestration apparatus may further comprise monitoring means for monitoring: dissolved carbon dioxide levels of carbon capture quantities; carbon to chlorophyll ratios; pH and alkalinity; and community phytoplankton species identification.

Preferably, the carbon sequestration apparatus further comprises control means, to control the productivity of the apparatus. The control means preferably comprises shutters at the surface of the light transmitting means. The shutters may be moveable between an open and a closed position in order to provide reflectivity of sunlight reaching the earth's surface when necessary. The shutter can be used to optimise light amplitude for photosynthetic efficiency. The shutter can be a mechanical shutter, or a liquid crystal shutter.

Mechanical shutters may take the form of iris diaphragms. Liquid crystal shutters may reflect light by increasing albedo using the mirroring effect of the shuttering mechanism. Liquid crystal shutters may take the form of cross polarisers. Both mechanical and liquid crystal shutters create greater albedo when the shutter is closed.

The marine-based buoyant structure of the present invention may have a diameter of substantially 50 kilometres.

The marine-based buoyant structure of the present invention may conveniently be sectional and/or modular. The structure may be rigidly or semi-rigidly coupled.

Preferably, the marine-based buoyant structure of the present invention is situated in oligotrophic gyres. In this regard, the structure is preferably configured to be geo-stationary or substantially geo-stationary. Preferably, the buoyant structure will be modular, with each module made up of many semi-rigidly connected hull units. In total the buoyant structure may comprise as many as 10,000 hull units.

Each hull unit may in this regard be created using 3D printing, and is hence easily replaceable. The buoyant structure is preferably self-propelled by propulsion units. Propulsion units may be conventional or novel means such as hydrodynamic wave energy, or magneto hydrodynamic energy conversion, or any suitable means.

According to a further aspect of the present invention there is provided a method of carbon sequestration, the method comprising providing a marine-based carbon sequestration buoyant structure as defined above in a major ocean gyre circulation.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention. Any subject matter described in this specification can be combined with any other subject matter in the specification to form a novel combination.

Various aspects of the invention will now be described in detail with reference to the accompanying figures. Still other aspects, features, and advantages of the present invention are readily apparent from the entire description thereof, including the figures, which illustrates a number of exemplary aspects and implementations. The invention is also capable of other and different examples and aspects, and its several details can be modified in various respects, all without departing from the scope of the present invention. Accordingly, each example herein should be understood to have broad application; and is meant to illustrate one possible way of carrying out the invention, without intending to suggest that the scope of this disclosure, including the claims, is limited to that example. Furthermore, the terminology and phraseology used herein is solely used for descriptive purposes and should not be construed as limiting in scope, In particular, unless otherwise stated, dimensions and numerical values included herein are presented as examples illustrating one possible aspect of the claimed subject matter, without limiting the disclosure to the particular dimensions or values recited. All numerical values in this disclosure are understood as being modified by "about". All singular forms of elements, or any other components described herein are understood to include plural forms thereof and vice versa.

Language such as "including", "comprising", "having", "containing", or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Thus, throughout the specification and claims unless the context requires otherwise, the word "comprise" or variations thereof such as "comprises" or "comprising" will be understood to imply the inclusion of a stated integer or group of integers but not the exclusion of any other integer or group of integers.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention.

References to directional and positional descriptions such as upper and lower and directions e.g. "up", "down" etc. are to be interpreted by a skilled reader in the context of the examples described to refer to the orientation of features shown in the drawings, and are not to be interpreted as limiting the invention to the literal interpretation of the term, but instead should be as understood by the skilled addressee.

BRIEF DESCRIPTION OF THE DRAWINGS

Embodiments of the present invention will now be described by way of example and with reference to the accompanying drawing in which:

FIG. 1 is a representative view of an example of a marine-based carbon sequestration buoyant structure, according to one embodiment of the present invention.

DETAILED DESCRIPTION OF THE INVENTION

Referring to FIG. 1, a representative view is provided of a marine-based carbon sequestration buoyant structure, according to one embodiment of the present invention.

In this example, the buoyant structure is approximately 50 kilometres in diameter and takes the form of a man-made floating island or raft. The buoyant structure is self-propelled and comprises a peripheral platform area 1 supported on a frame. The peripheral platform area may typically be approximately 2 kilometres wide in a radial direction. As shown, in this example, the peripheral platform area is annular.

Although not shown in FIG. 1, the structure may be sectional and/or modular. The sections may be rigidly or semi-rigidly coupled. In this regard, the structure may comprise a plurality of polygonal profiled elements coupled together. For example, regular polygonal shaped elements, such as hexagons may be used as building blocks for the structure. Each such element may be around 11 km flat side to flat side and in this case 19 of them could form a full structure In this connection, whilst alternative materials may be used to form the buoyant structure, hemperete or a similar natural fibre based building material may be preferred. In this respect, compared to grassland, hemp plant absorbs a high level of atmospheric $CO_2$ as it grows, and consequently hemperete may lock away a net 100 kg of $CO_2$ per metre cubed or more. As such, it represents a carbon zero or better than carbon zero construction solution.

Furthermore, appropriate buoyancy for the structure can be readily attained, with the typical density of hemperete falling within 93-136 kg/m³.

In order to enhance buoyancy, the hemperete may be at least partially plasticised. In this regard, areas of the hemperete may be left un-plasticised to promote continued $CO_2$ uptake. For example, upward facing or upper areas of the structure may be un-plasticised.

As shown, a giant moon-pool is formed within the peripheral platform area 1. The moon-pool has a diameter of substantially 46 kilometres with the entire structure being substantially 50 kilometres in diameter.

The moon-pool is occupied by devices (2) for connecting the surface waters with sub-thermocline waters. These devices may include pipes to exchange water, and transparent bodies (3) to carry light and/or radiative heat to deep nutrient rich waters (4). Such bodies (3) may take the form of light pipes or light trees, for example having glass tendrils formed of fibre-optic elements. The light pipes or light trees may be provided with a surface lens for enhancing their function. The light pipes preferably have a glass chemistry conducive to conveying visible light, in particular a spectrum centred on the visible spectrum of 350-700 nm (nanometers).

Although not shown in the drawing, the devices (2) may include light providing means. These can take the form of solar panels, such as photo-voltaic panels, coupled by way of electrical conductors, such as copper cables, to light emitting devices, such as light emitting diodes.

Such light providing means may be provided additionally to or instead of the transparent bodies, The structure is held largely geo-stationary by propulsion units (5) in oligotrophic ocean gyres at tropical and subtropical latitudes.

Whilst the peripheral platform area could be narrower or wider to suit local requirements, preferably the outer peripheral platform area 1 of the island is substantially 2 kilometres wide.

The peripheral platform area 1 is provided with for example, hotels, houses, shops, and other amenities that one would find in an area populated by humans.

Preferably, the outer ring may house an international scale airport (6), as well as leisure facilities, such as water sports and fishing.

Preferably, the outer ring will sustainably provide for up to 1 million visitors to the structure.

Preferably, 10-30 of the buoyant structures, as depicted in FIG. 1, may be present in each of the 5 major oligotrophic gyres of the world's oceans.

In total it is expected that 100 of these islands would be required to both reverse the anthropogenic carbon dioxide levels if required, but more importantly to work as Climostats (CLIMate thermOSTATS), or Carbostats, to control the levels of atmospheric carbon dioxide and ocean acidification that we wish to achieve on our planet. Typically, according to the approximate relative surface areas of the 5 gyres, 10 of these Productivity Islands may be necessary in the North Atlantic, 15 may be necessary in the South Atlantic, 20 in the Indian Ocean, 25 in the North Pacific, and 30 in the South Pacific oligotrophic gyres. In total, the Productivity Islands will have a capacity to capture between 5 and 10 Gt and therefore more than enough capacity to control the volume of atmospheric carbon dioxide taken up through gas exchange to mitigate our anthropogenic climate impacts; and control the level of ocean acidification to restore coral reefs to their former glory. Furthermore, the geographical presence of these Productivity Islands is considered ideal for cleaning-up the ocean garbage patches and improving our understanding of ocean circulation. The material within the garbage patches may be incorporated into the fabric of the buoyant structures.

In this way, it is calculated that less than ⅓ million km2 of these oligotrophic gyres is required to control up to 10 Gt of extra carbon uptake, which is more than the 7-9 Gt annual anthropogenic excess. This area is less than 0.1% of ocean surface area and less than 0.7% of the surface of the deep ocean oligotrophic gyres.

The invention claimed is:

1. A marine-based carbon sequestration buoyant structures for capturing global anthropogenic carbon output, each structure comprising:
   a frame;
   a peripheral platform area which houses accommodation and amenities; and
   carbon sequestration apparatus, the carbon sequestration apparatus comprising light transmitting means in the form of light pipes or light trees for connecting with sub-thermocline waters,
   wherein the frame supports the peripheral platform area and carbon sequestration apparatus, and
   wherein each structure is modular, comprising a plurality of units coupled together, whereby the one or more structures capture up to 10 Gt of carbon per year.

2. A structure according to claim 1, wherein the peripheral platform area is configured to at least partially encompass the carbon sequestration apparatus.

3. A structure according to claim 1, wherein the peripheral platform area has an annular form.

4. A structure according to claim 3, wherein the structure further comprises a moon pool provided within the peripheral platform area.

5. A structure according to claim 4, wherein the moon pool has a diameter of up to approximately 40-50 km and the peripheral platform area is substantially 1-4 km wide.

6. A structure according to claim 4, wherein the carbon sequestration apparatus is mountable within the moon pool.

7. A structure according to claim 1, wherein the peripheral platform area is provided as a cross-shaped or grid-like configuration, where the carbon sequestration apparatus is provided between elements of the cross-shaped or grid-like peripheral platform area extending normally to one another.

8. A structure according to claim 1, wherein the light transmitting means are glass tendrils for connecting with sub thermocline waters.

9. A structure according to claim 8, wherein the glass tendrils extend approximately 70 to 300 metres below the water surface level.

10. A structure according to claim 9, wherein the glass tendrils extend around 10 km radially outward.

11. A structure according to claim 1, wherein the carbon sequestration apparatus further comprises water exchanging means.

12. A structure according to claim 11, wherein the water exchanging means comprises wave pump tubes.

13. A structure according to claim 1, wherein the carbon sequestration apparatus further comprises monitoring means for monitoring carbon dioxide levels/carbon capture quantities.

14. A structure according to claim 1, wherein said structure is situated in oligotrophic gyres.

15. A structure according to claim 1, wherein modules of the structure are rigidly or semi-rigidly coupled.

16. A structure according to claim 1, wherein the carbon sequestration apparatus further comprises light providing means.

17. A structure according to claim 16, wherein the light providing means comprises: a plurality of photo-voltaic panels; copper conducting cables; and light emitting diodes.

18. A structure according to claim 1, wherein the carbon sequestration apparatus further comprises control means.

19. A structure according to claim 18, wherein the control means is a shutter.

20. A structure according to claim 1, wherein the carbon sequestration apparatus further comprises a lens.

21. A method of carbon sequestration, the method comprising providing a marine-based carbon sequestration buoyant structure comprising a marine-based carbon sequestration buoyant structure, comprising: a frame; a peripheral platform area which houses accommodation and amenities; and carbon sequestration apparatus, the carbon sequestration apparatus comprising light transmitting means in the form of light pipes or light trees for connecting with sub-thermocline waters, wherein the frame supports the peripheral platform area and carbon sequestration apparatus, and wherein each structure is modular, comprising a plurality of units coupled together, whereby the one or more structures capture up to 10 Gt of carbon per year, in a major ocean gyre circulation.

* * * * *